United States Patent
Yao et al.

(10) Patent No.: US 11,449,727 B2
(45) Date of Patent: Sep. 20, 2022

(54) METHOD, STORAGE MEDIUM AND ELECTRONIC DEVICE FOR DETECTING VEHICLE CRASHES

(71) Applicant: NEUSOFT CORPORATION, Shenyang (CN)

(72) Inventors: Jian Yao, Shenyang (CN); Michael Zhang, Shenyang (CN); Lili Xu, Shenyang (CN)

(73) Assignee: NEUSOFT CORPORATION, Shenyang (CN)

( * ) Notice: Subject to any disclaimer, the term of this patent is extended or adjusted under 35 U.S.C. 154(b) by 1251 days.

(21) Appl. No.: 15/857,844

(22) Filed: Dec. 29, 2017

(65) Prior Publication Data
US 2019/0050711 A1    Feb. 14, 2019

(30) Foreign Application Priority Data
Aug. 8, 2017 (CN) .......................... 201710672705.1

(51) Int. Cl.
*G06N 3/00* (2006.01)
*G06N 3/04* (2006.01)
(Continued)

(52) U.S. Cl.
CPC .............. *G06N 3/04* (2013.01); *B60W 40/00* (2013.01); *G06K 9/6267* (2013.01);
(Continued)

(58) Field of Classification Search
None
See application file for complete search history.

(56) References Cited

U.S. PATENT DOCUMENTS 9,760,806 B1* 9/2017 Ning ........................ G06T 7/277
10,139,823 B2* 11/2018 Prokhorov ....... G08G 1/096811
(Continued)

FOREIGN PATENT DOCUMENTS

CN    105389984 A    3/2016
CN    106004883 A    10/2016
(Continued)

OTHER PUBLICATIONS

Stutz, David. "Understanding Convolutional Neural Networks." (2014). (Year: 2014).*
(Continued)

*Primary Examiner* — Gurkanwaljit Singh
(74) *Attorney, Agent, or Firm* — Volpe Koenig

(57) ABSTRACT

The present disclosure relates to method, storage medium and electronic device for detecting vehicle crashes. The method comprises: acquiring state information of a target vehicle; and determining an event type of the target vehicle according to the state information and a trained convolutional neural network, the event type being any of the following types: a crash event, a near crash event and a baseline event. The event type of the vehicle is determined using the trained convolutional neural network in the present disclosure, so that the accuracy is high; and near crash events can be detected, thus, when a near crash event is detected, the driver can be further alerted or an evading operation is directly performed on the vehicle, so that the safety is improved and the safety of the driver and passengers is guaranteed.

10 Claims, 6 Drawing Sheets

(51) Int. Cl.
  *G06N 3/08* (2006.01)
  *G06K 9/62* (2022.01)
  *B60W 40/00* (2006.01)
  *G08G 1/00* (2006.01)
  *G06V 20/58* (2022.01)

(52) U.S. Cl.
  CPC ............ *G06N 3/0454* (2013.01); *G06N 3/08* (2013.01); *G06V 20/58* (2022.01); *G08G 1/00* (2013.01)

(56) References Cited

U.S. PATENT DOCUMENTS

| | | | | |
|---|---|---|---|---|
| 10,332,320 | B2* | 6/2019 | Lakshamanan | B60W 30/00 |
| 10,387,774 | B1* | 8/2019 | Cao | G06N 3/08 |
| 10,871,548 | B2* | 12/2020 | Volgyesi | G01S 5/28 |
| 10,922,566 | B2* | 2/2021 | el Kaliouby | G06N 3/084 |
| 2010/0283832 | A1* | 11/2010 | Lin | G06K 9/6293 |
| | | | | 348/46 |
| 2017/0060254 | A1* | 3/2017 | Molchanov | G01S 7/415 |
| 2017/0328983 | A1* | 11/2017 | Volgyesi | G01S 5/28 |
| 2018/0074493 | A1* | 3/2018 | Prokhorov | B60W 30/00 |
| 2018/0114114 | A1* | 4/2018 | Molchanov | G06N 3/084 |
| 2018/0300964 | A1* | 10/2018 | Lakshamanan | G06N 20/00 |
| 2018/0330178 | A1* | 11/2018 | el Kaliouby | A61B 5/1079 |
| 2018/0330238 | A1* | 11/2018 | Luciw | G06V 10/255 |
| 2018/0341839 | A1* | 11/2018 | Malak | G06V 30/274 |
| 2018/0348343 | A1* | 12/2018 | Achour | G01S 7/417 |
| 2019/0121350 | A1* | 4/2019 | Cella | H03M 13/353 |

FOREIGN PATENT DOCUMENTS

| | | |
|---|---|---|
| CN | 106340205 A | 1/2017 |
| CN | 106553655 A | 4/2017 |

OTHER PUBLICATIONS

Cui, Zhicheng, Wenlin Chen, and Yixin Chen. "Multi-scale convolutional neural networks for time series classification." arXiv preprint arXiv:1603.06995 (2016). (Year: 2016).*

O'Shea, Keiron, and Ryan Nash. "An introduction to convolutional neural networks." arXiv preprint arXiv:1511.08458 (2015). (Year: 2015).*

Liang, Ming, and Xiaolin Hu. "Recurrent convolutional neural network for object recognition." Proceedings of the IEEE conference on computer vision and pattern recognition. 2015. (Year: 2015).*

Bag, S. (Feb. 2017). Deep learning localization for self-driving cars (Order No. 10259012). Available from ProQuest Dissertations and Theses Professional. (1880508671). (Year: 2017).*

Wang et al., "Driving behavior recognition based on Sparse Filtering-Convolutional Neural Network", Computer Engineering and Applications, 54 (11), p. 128-132; Xi'an University of Posts & Telecommunications (2018).

Chinese Office Action dated Mar. 3, 2021 for Chinese Patent Application No. 201710672705.1.

Chinese Search Report dated Sep. 2, 2019 for Chinese Patent Application No. 201710672705.1.

* cited by examiner

|  | Width 60 | | | | | | Input 1 |
|---|---|---|---|---|---|---|---|
| Channel 1 | 51.4 | 50.9 | 50.2 | ...... | 30.8 | 29.3 | |
| Channel 2 | -0.255 | -0.246 | -0.278 | ...... | -0.58 | -0.65 | |
| Channel 3 | 0.009 | 0.026 | 0.032 | ...... | -0.078 | 0.099 | |
| Channel 4 | -0.957 | -0.957 | -0.983 | ...... | -0.905 | -0.966 | |
| Channel 5 | -0.325 | 0 | 0 | ...... | -3.902 | -3.577 | |
| Channel 6 | -0.976 | -0.976 | -0.65 | ...... | 0.65 | 0 | |
| Channel 7 | 0.325 | 0.325 | 0.65 | ...... | -1.626 | 1.626 | |

(7 channels)

⋮

Input n

......

METHOD, STORAGE MEDIUM AND ELECTRONIC DEVICE FOR DETECTING VEHICLE CRASHES

CROSS REFERENCE TO RELATED APPLICATION

This application claims the benefit of Chinese Application No. 201710672705.1, filed Aug. 8, 2017, which is incorporated by reference as if fully set forth.

FIELD OF THE INVENTION

The present disclosure relates to the field of vehicle data processing, and specifically, relates to method, apparatus, storage medium, electronic device and vehicle for detecting vehicle crashes.

BACKGROUND OF THE INVENTION

Automatic detection of vehicle crashes is beneficial to timely notifying crash accidents to relevant personnel and organizations, including first-aid personnel, family members, team principals and insurance companies. On the other hand, timely detection of crash accidents is also beneficial to investigating the accidents.

In some relevant technologies, vehicle crashes are automatically detected directly using crash detection hardware sensors. In some other relevant technologies, operational data of vehicles are acquired using vehicle-mounted sensors or mobile sensors, and feature values are calculated via the methods of integration, difference and the like according to the sensor data. Then, thresholds are calculated via these feature values to determine whether crashes happen.

SUMMARY OF THE INVENTION

In order to solve the problems in relevant technologies, the present disclosure is aimed at providing method, apparatus, electronic device and vehicle for detecting vehicle crashes.

In a first aspect, the present disclosure provides a method for detecting vehicle crashes, including:

acquiring state information of a target vehicle; and determining an event type of the target vehicle according to the state information and a trained convolutional neural network, the event type being any of the following types: a crash event, a near crash event and a baseline event.

In a second aspect, the present disclosure provides an apparatus for detecting vehicle crashes, including:

an acquisition module, used for acquiring state information of a target vehicle; and a determination module, used for determining an event type of the target vehicle according to the state information and a trained convolutional neural network, the event type being any of the following types: a crash event, a near crash event and a baseline event.

In a third aspect, the present disclosure provides a computer readable storage medium, storing a computer program which, when executed by a processor, performs the steps of said method.

In a fourth aspect, the present disclosure provides an electronic device, including:

the computer readable storage medium in said third aspect; and one or more processors, used for executing the program in the computer readable storage medium.

In a fifth aspect, the present disclosure provides a vehicle, including:

the computer readable storage medium in said third aspect; and one or more processors, used for executing the program in the computer readable storage medium.

In said technical solutions, the event type of the vehicle is determined using the trained convolutional neural network, so that the accuracy is high; and near crash events can be detected, thus, when a near crash event is detected, the driver can be further alerted or an evading operation (braking, abrupt turning, or the like) can be directly performed on the vehicle, so that safety is improved and the safety of the driver and passengers is guaranteed.

Other features and advantages of the present disclosure will be described in detail in the following specific embodiments.

BRIEF DESCRIPTION OF THE DRAWINGS

The accompanying drawings are used for providing further understanding on the present disclosure, constituting a part of the specification, and interpreting the present disclosure together with the following specific embodiments, rather than limiting the present disclosure. In the drawings.

DETAILED DESCRIPTION OF THE EMBODIMENTS

The specific embodiments of the present disclosure will be described in detail below in combination with the accompanying drawings. It should be understood that the specific embodiments described herein are merely used for illustrating and interpreting the present disclosure, rather than limiting the present disclosure.

Figure 1:
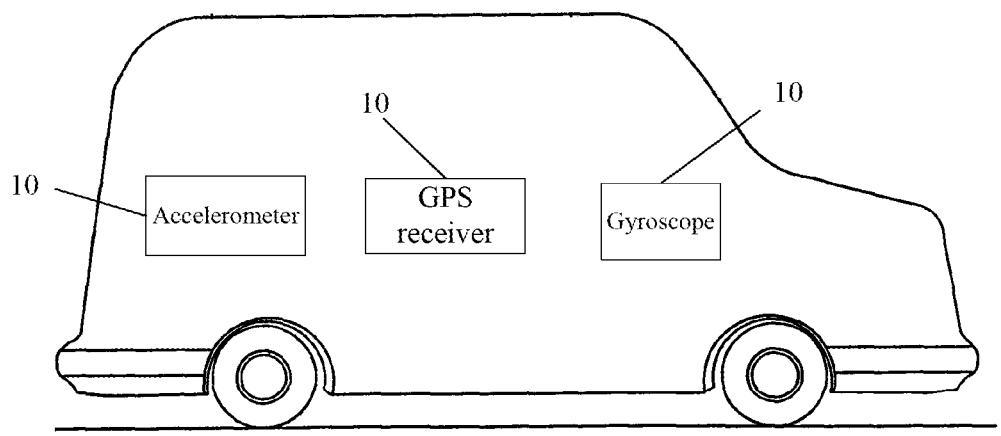
FIG. 1 is a schematic diagram of a vehicle of an embodiment of the present disclosure.

Refer to FIG. 1, which is a schematic diagram of a vehicle of an embodiment of the present disclosure. Sensors 10 may be a GPS (Global Positioning System), an accelerometer, a gyroscope and the like arranged in a vehicle. In some embodiments, the sensors 10 may also be arranged in an electronic device which is placed in a vehicle, therefore, the states of the sensors in the electronic device can reflect state information of the vehicle.

State information of the vehicle can be acquired via the sensors 10. The speed of the vehicle, as well as the longitude, latitude, height, course and the like at different time points can be acquired via the GPS. The accelerometer can acquire accelerations in X, Y and Z directions at different time points. The gyroscope can acquire angular speeds of the vehicle at different time points, including angular speeds in the X direction, angular speeds in the Y direction and angular speeds in the Z direction.

Figure 2:
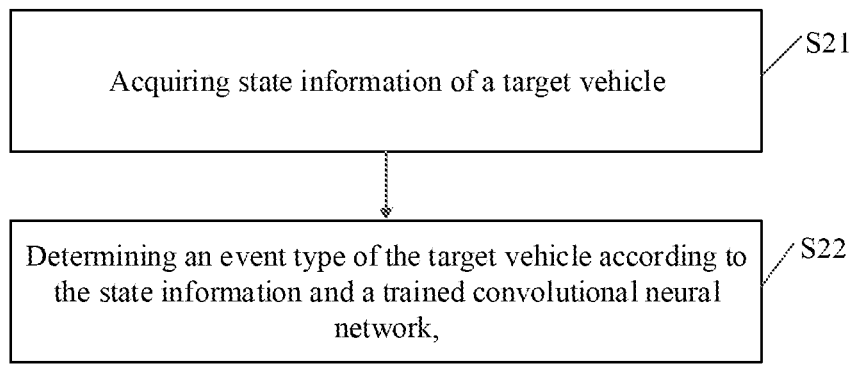
FIG. 2 is a schematic flow diagram of a method for detecting vehicle crashes of an embodiment of the present disclosure.

Refer to FIG. 2, which is a schematic flow diagram of a method for detecting vehicle crashes of an embodiment of the present disclosure. The method includes the steps as follow.

In step S21, state information of a target vehicle is acquired.

In step S22, an event type of the target vehicle is determined according to the state information and a trained convolutional neural network.

In the embodiment of the present disclosure, the event type of the vehicle is determined according to the state information of the vehicle acquired in real time and the trained convolutional neural network. Wherein, the event type is any of the following types: a crash event, a near crash event and a baseline event.

The crash event refers to that the vehicle is in crash contact with a moving or motionless obstacle (e.g., other vehicle, building, etc.), and the original running speed of the vehicle is obviously transferred or disappears. When the crash event happens, one or more of the following situations generally happen: the safety airbag deployment of the vehicle collapses; a driver, a pedestrian or a bicycle rider is injured; the vehicle turns over; a very large speed change or acceleration change occurs; traction of other vehicle is needed; and property loss is caused. The resulting personal injury needs the help of doctors. Besides, a crash with a large animal, a crash with an sign posts and the like also belong to crash events.

The near crash event is any event in which the current vehicle needs to quickly evade to avoid a crash. The vehicle does not contact any moving or fixed obstacle. The word "evade" herein means to control turning, braking or deceleration of the vehicle or a combination thereof, thereby avoiding the potential crash. Evading is quick, i.e., the time that the driver of the vehicle makes a response is short. In the near crash event, the distance between the vehicle and the obstacle is controlled within a certain range (e.g., 0.1 to 0.5 meter).

The baseline event involves a normal driving behavior without crash or near crash.

In the method for detecting vehicle crashes of the embodiment of the present disclosure, the event type of the vehicle is determined using the trained convolutional neural network, so that the accuracy is high; and near crash events can be detected, thus, when a near crash event is detected, the driver can be further alerted or an evading operation (braking, abrupt turning, or the like) is directly performed on the vehicle, so that safety is improved and the safety of the driver and passengers is guaranteed.

The convolutional neural network in the abovementioned step S22 is obtained by training, and the training process of the convolutional neural network will be introduced below.

The data acquired by the sensors is time series data, including state information of the vehicle recorded by the sensors according to time, i.e., state information with timestamps. In one embodiment, the state information of the vehicle includes: speed, acceleration in the X direction, acceleration in the Y direction, acceleration in the Z direction, angular speed in the X direction, angular speed in the Y direction and angular speed in the Z direction.

The training sample adopted in the training phase is time series data with event type tags. Wherein, the time series data corresponding to each time point has an event type tag.

In the embodiment of the present disclosure, the time series data with event type tags can be acquired in any of the following modes.

Mode I: an event type corresponding to the vehicle image is determined by means of image recognition according to a vehicle image acquired by an image acquisition device, and marking of the event type is performed on the time series data corresponding to the vehicle image.

Figure 3:
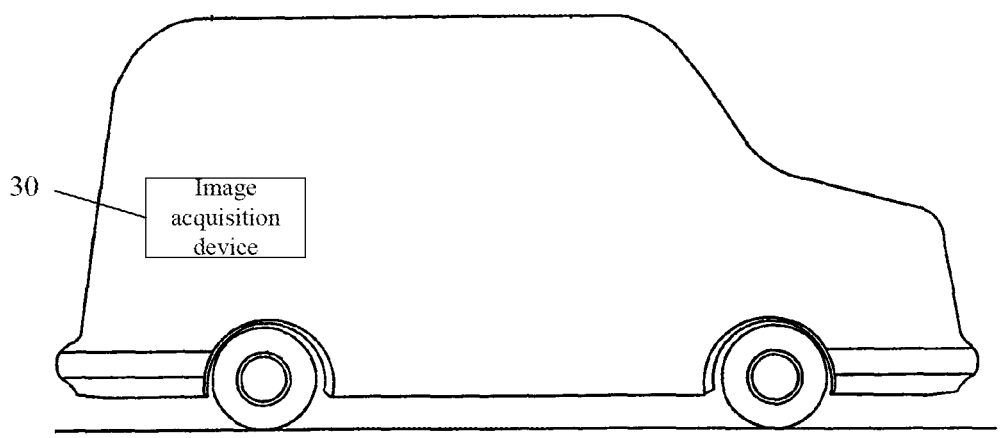
FIG. 3 is a schematic diagram of a vehicle of another embodiment of the present disclosure.

Referring to FIG. 3, the vehicle includes an image acquisition device 30 arranged in the vehicle. The image acquisition device 30 may be a camera, a dashboard camera or the like, and is used for acquiring vehicle images. There may be a plurality of image acquisition device 30, which are respectively arranged at the front, back, left and right parts of the body of the vehicle. The acquired vehicle images include an image in front of the vehicle, an image in back of the vehicle, an image on the side of the vehicle, etc. The image in front of the vehicle can reflect a vehicle event of the vehicle and a front obstacle. The image in back of the vehicle can reflect a vehicle event of the vehicle and a back obstacle. The image on the side of the vehicle can reflect a vehicle event of the vehicle and a side obstacle.

Figure 4:
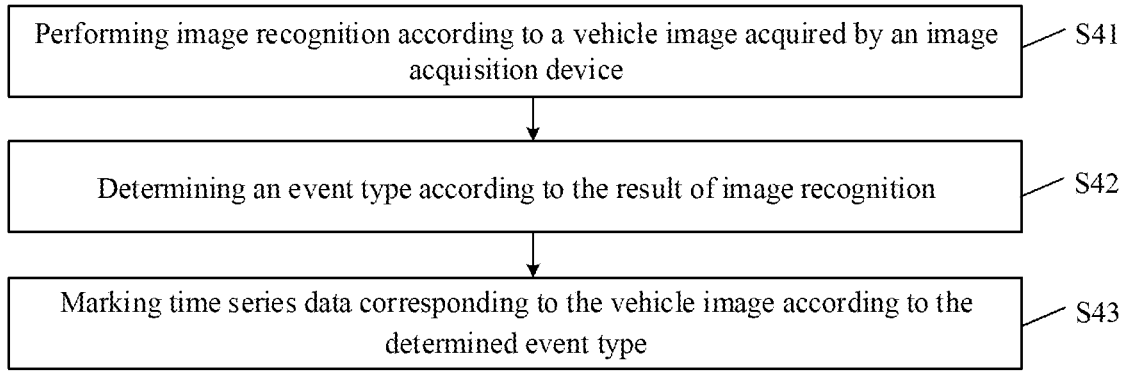
FIG. 4 is a schematic flow diagram of marking an event type via image recognition in an embodiment of the present disclosure.

Refer to FIG. 4, which is a schematic flow diagram of marking an event type via image recognition in an embodiment of the present disclosure.

In step S41, image recognition is performed according to a vehicle image acquired by an image acquisition device.

The process of image recognition on the vehicle image may include preprocessing of the vehicle image, recognition on the body of the vehicle and the obstacle around the vehicle, etc.

In step S42, an event type is determined according to the result of image recognition.

An event type is determined according to the vehicle image acquired by the image acquisition device 30, for example, the image acquired and preprocessed by the image acquisition device 30 can be matched with a standard image, then the similarity between the acquired vehicle image and the standard image is determined according to the matching result, and whether the vehicle undergoes crash or near crash with the obstacle is determined according to the similarity. The standard image may be a vehicle image not undergoing crash or near crash among the acquired vehicle images. The standard image may also be a vehicle image undergoing crash or near crash among the acquired vehicle images. The vehicle images acquired by the image acquisition device 301 may be the ones of the vehicle in the front, back, left and right directions, and thus, in determining the standard image, vehicle images corresponding to different directions can be respectively determined according to different directions.

In step S43, the time series data corresponding to the vehicle image is marked according to the determined event type.

Based on mode I, event type marking is performed on the time series data via image recognition, so that the time series data with event type tags can be used as the training sample.

Mode II: a vehicle event corresponding to the vehicle image is determined by means of artificial recognition according to the vehicle image acquired by the image acquisition device, and thus, marking of an event type is performed on the time series data corresponding to the vehicle image to obtain time series data with an event type tag.

Mode III: time series data with event type tags is acquired from a relevant database and used as a training sample. For example, time series data with event type tags can be acquired from a database of a natural driving research project.

When mode I and mode II described above are adopted, the image acquired by the image acquisition device 301 is synchronous with the time series data acquired by the sensor. The time when the event corresponding to the time series data occurs can be accurately positioned via the image acquired by the image acquisition device 301 and the time series data acquired by the sensor, thereby realizing accurate event type marking on the time series data.

Figure 5:
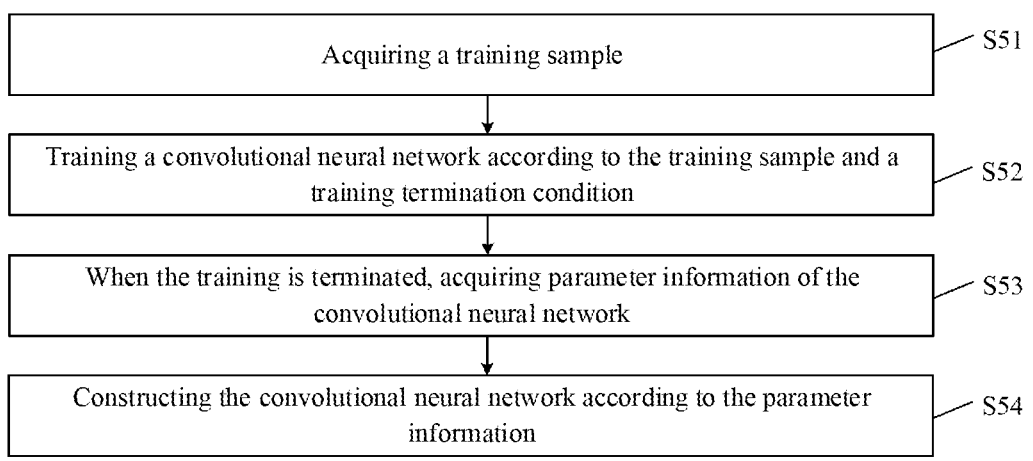
FIG. 5 is a schematic flow diagram of training a convolutional neural network in an embodiment of the present disclosure.

Refer to FIG. 5, which is a schematic flow diagram of training a convolutional neural network in an embodiment of the present disclosure.

In step S51, a training sample is acquired.

In step S52, a convolutional neural network is trained according to the training sample and a training termination condition.

In step S53, when the training is terminated, parameter information of the convolutional neural network is acquired, the parameter information at least including: weights of a convolution layer, biases of the convolution layer, weights of a pooling layer, biases of the pooling layer, weights of a fully connected layer, biases of the fully connected layer, number of convolution layers, size of the convolution kernel of each convolution layer, number of pooling layers, size of each pooling layer, number of fully connected layers and size of each fully connected layer.

In step S54, a convolutional neural network is constructed according to the parameter information. The convolutional neural network is used for predicting an event type of a vehicle.

In an embodiment of the present disclosure, in step S51, after time series data with event type tags is acquired in any of the modes described above as the training sample, it further includes preprocessing on data of the training sample.

Figure 6:
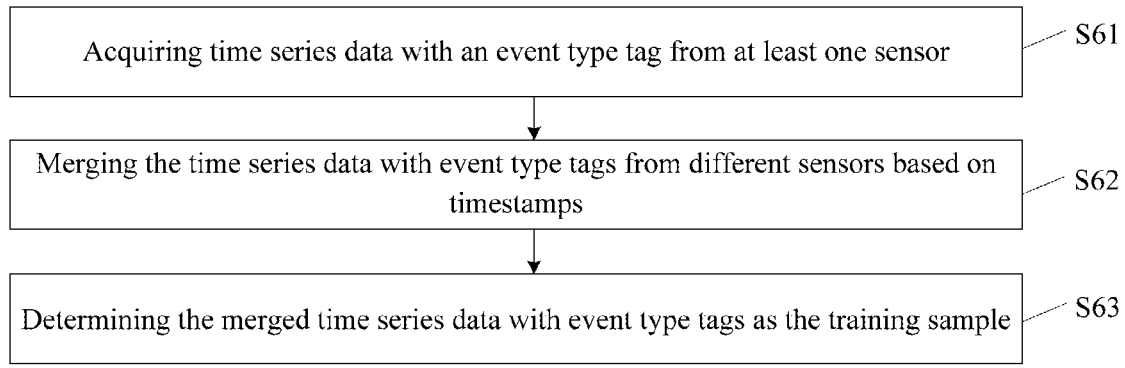
FIG. 6 is a schematic flow diagram of preprocessing a training sample in an embodiment of the present disclosure.

Refer to FIG. 6, which is a schematic flow diagram of preprocessing a training sample in an embodiment of the present disclosure.

In step S61, time series data with an event type tag from at least one sensor is acquired.

In step S62, the time series data with event type tags from different sensors is merged based on timestamps.

In step S63, the merged time series data with event type tags is determined as the training sample.

Figure 7:
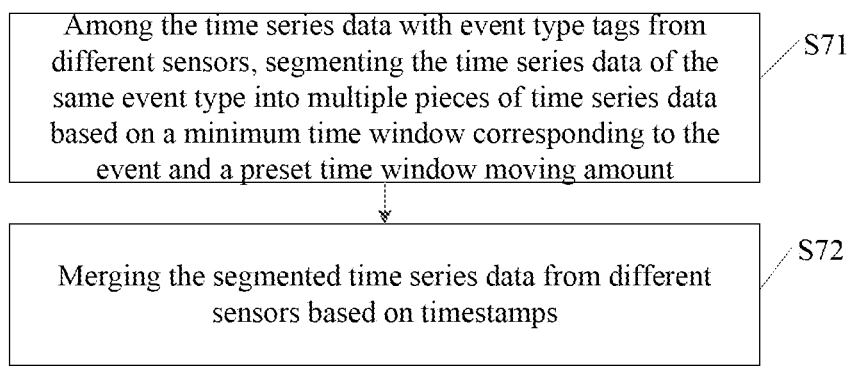
FIG. 7 is a schematic flow diagram of augmenting time series data from a sensor in an embodiment of the present disclosure.

Referring to FIG. 7, in an embodiment of the present disclosure, time series data from sensors can be augmented to increase the data volume of a training sample for training, step S62 described above includes:

In step S71, among the time series data with event type tags from different sensors, the time series data of the same event type is segmented into multiple pieces of time series data based on a minimum time window corresponding to the event and a preset time window moving amount.

For the time series data with event type tags from different sensors, the time series data of the same event type can be recognized according to the event type tags. Thus, the time series data of the same event type can be segmented according to the minimum time window corresponding to the event of the event type and the preset time window moving amount to increase the trained data volume. For example, for a crash event, the time length of the minimum time window may be 6 seconds, the preset time window moving amount may be 0.5 second, then from a certain time point t, the time series data within (t+6) seconds is the first segment of data, the time series data within (t+6+0.5) seconds is the second segment of data, and so on, till the termination condition is satisfied. The termination condition may refer to that the event types of the time series data are no longer same after moving according to the preset time window moving amount, e.g., when moving N times, the time series data within [(t+6+0.5)*N] seconds is no longer crash time. The termination condition may also refer to that the number of movements reaches a set value, e.g., the set value of the number of movements may be M, and segmentation is stopped when moving to [(t+6+0.5)*M].

Thus, the time series data of the same event type can be segmented into multiple segments to increase the data volume, the event type of each segment is same. When the convolutional neural network is trained later, each segment of time series data obtained by segmentation can be used as an input.

In step S72, the segmented time series data from different sensors is merged based on timestamps.

As mentioned above, the state information of the vehicle may include vehicle speed, acceleration, angular speed, etc., and the data may be acquired by different sensors, so the acquired time series data with event type tags is data from different sensors. In some embodiments, when different sensors acquire and record data, hardware faults or signal transmission faults may happen, the data acquisition frequencies of different sensors may also be different, thus, if the timestamps of the time series data from different sensors are different, missing values are filled into the time series data via a linear interpolation compensation method.

Figure 8:
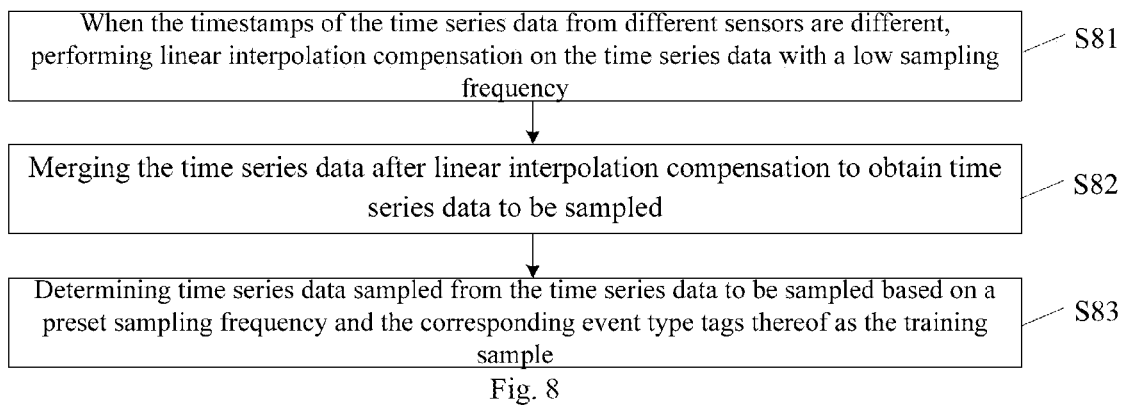
FIG. 8 is a schematic flow diagram of merging time series data based on timestamps in an embodiment of the present disclosure.

Referring to FIG. 8, in an embodiment of the present disclosure, when the time series data is merged based on the timestamps and the timestamps need to be unified, the step of merging the time series data based on the timestamps includes:

In step S81, when the timestamps of the time series data from different sensors are different, linear interpolation compensation is performed on the time series data with a low sampling frequency.

For example, the sampling frequency of the data from the sensor 1 is 10 Hz, and the sampling frequency of the data from the sensor 2 is 100 Hz, so that the timestamps are different. The data with the sampling frequency of 10 Hz is interpolated to the high frequency of 100 Hz first, so that the data from the sensor 1 and the data from the sensor 2 are both 100 Hz and have the same timestamp.

The time series data from different sensors in this step may be the time series data acquired in step S61 described above, or the time series data segmented in step S71 described above.

In step S82, the time series data after linear interpolation compensation is merged to obtain time series data to be sampled.

After step S81, the time series data has the same timestamp, and can be merged. In the embodiment of the present disclosure, merging enables the time series data from different sensors at the same time point to be aligned.

Referring to table 1 below, each row of data in table 1 is data obtained after merging the time series data from different sensors at the same time point.

In step S83, the time series data sampled from the time series data to be sampled based on a preset sampling frequency and the corresponding event type tags thereof are used as the training sample.

After step S82 described above, the sampling frequencies of the time series data among the time series data to be sampled are unified, e.g., unified to a higher sampling frequency 100 Hz. In step S83, the time series data serving as a training sample can be acquired from the merged time series data to be sampled based on a preset sampling frequency (e.g., 10 Hz). It should be understood that the preset sampling frequency in step S83 can be set according to the data volume required for training.

As mentioned above, after the training sample is preprocessed, step S52 described above can be executed, i.e., the convolutional neural network is trained according to the training sample and a preset number of iterations. The convolutional neural network to be trained herein has initial parameter information, which is continually adjusted in the training process.

Refer to table 1, which shows a piece of time series data serving as an input in the training sample. The time series data serving as the input of the convolutional neural network can be obtained by segmentation according to the method shown in FIG. 7 or directly obtained according to step S62.

TABLE 1

| Channel 1 | Channel 2 | Channel 3 | Channel 4 | Channel 5 | Channel 6 | Channel 7 |
|---|---|---|---|---|---|---|
| 5.872 | 2.371 | −7.482 | −6.067 | 0.003 | 0.004 | 0.008 |
| 5.891 | 2.348 | −7.409 | −5.913 | 0.011 | 0.012 | 0.019 |
| 5.91 | 2.436 | −7.441 | −6.174 | 0.003 | 0.011 | 0.01 |
| 5.929 | 2.362 | −7.426 | −6.199 | 0.002 | 0.005 | 0.004 |
| 5.948 | 2.237 | −7.356 | −5.882 | 0.011 | 0.014 | 0.017 |
| 5.966 | 2.347 | −7.385 | −5.963 | 0.007 | 0.015 | 0.015 |
| 5.985 | 2.456 | −7.481 | −6.277 | −0.002 | 0.005 | 0.002 |
| 6.004 | 2.274 | −7.449 | −6.044 | 0.007 | 0.009 | 0.013 |
| 6.023 | 2.36 | −7.49 | −5.919 | 0.009 | 0.016 | 0.016 |
| 6.042 | 2.523 | −7.538 | −6.234 | −0.001 | 0.009 | 0.002 |
| 6.061 | 2.388 | −7.486 | −6.2 | 0.004 | 0.005 | 0.005 |
| ... | | | | | | |
| 6.645 | 2.315 | −7.305 | −5.953 | 0.009 | 0.016 | 0.013 |
| 6.664 | 2.325 | −7.37 | −5.935 | −0.003 | 0.007 | 0 |
| 6.682 | 2.546 | −7.424 | −6.088 | −0.001 | 0.021 | −0.013 |
| 6.701 | 2.313 | −7.541 | −6.195 | −0.084 | 0.044 | −0.109 |
| 6.72 | 2.567 | −7.295 | −6.359 | −0.616 | 0.181 | −0.661 |
| 6.739 | 3.357 | −5.967 | −7.196 | −0.841 | −0.649 | −0.975 |
| 6.758 | 2.517 | −4.837 | −7.988 | −0.675 | −0.962 | −0.95 |

The time series data shown in table 1 includes 7 signal channels, the time length is 6 seconds, the sampling frequency is 10 Hz, and the data segment is thus a 60×7 two-dimensional array. The 7 signal channels respectively correspond to different state information of the vehicle: speed, orthogonal acceleration in the x orthogonal direction, orthogonal acceleration in the y orthogonal direction, orthogonal acceleration in the z orthogonal direction, angular speed in the x orthogonal direction, angular speed in the y orthogonal direction and angular speed in the z orthogonal direction.

Figures 9, 10:
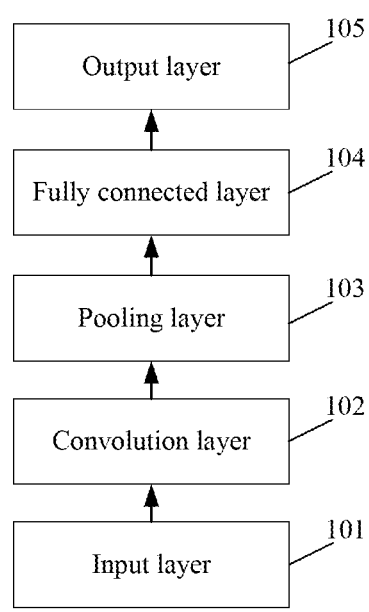
FIG. 9 is an input schematic diagram of a convolutional neural network to be trained in an embodiment of the present disclosure.
FIG. 10 is a schematic diagram of a convolutional neural network of an embodiment of the present disclosure.

Referring to FIG. 9, in an embodiment, the input of the convolutional neural network to be trained is multiple pieces of time series data with the height of 1, the width of 60, and 7 channels.

Referring to FIG. 10, the convolutional neural network in an embodiment of the present disclosure includes an input layer 101, a convolution layer 102, a pooling layer 103, a fully connected layer 104 and an output layer 105.

The convolution layer 102 is used for extracting the feature of each channel of the input time series data. A group of weights for extracting these features form a convolution kernel. The convolution kernel moves on each channel with a stride, and is convolved with data to obtain feature mapping. A bias coefficient is added to each convolution result, and calculation is performed through an activation function to obtain an output result of the convolution layer.

In the embodiment of the present disclosure, the channels share one channel multiplier.

The pooling layer 103 is used for performing sub sampling on data segments, thereby reducing the data processing amount and simultaneously reserving useful information. The pooling layer is located behind the convolution layer, and samples, on the feature mapping of the convolution layer, a point (e.g., maximum sampling, mean sampling, random sampling, etc.) in an area having a fixed size as an input of the next layer.

The fully connected layer 104 is connected with the pooling layer 103, and connects all neurons obtained by the pooling layer to each neuron of the fully connected layer respectively. Each neuron of the fully connected layer is connected with the neurons of all output feature maps of previous layer, and all the obtained feature maps are arranged in the form of column vectors via an activation function to obtain an output.

Each output of the fully connected layer 104 can be regarded as a sum obtained by adding a bias b to the product of each node of previous layer and a weight W.

The activation function for the fully connected layer 104 may be a hyperbolic tangent function, e.g., a Tan h function.

The output layer 105 multiplies a column vector output by the fully connected layer with a weight matrix, and then adds a bias term and generates a column vector via an activation function. In the embodiment of the present disclosure, a K-dimensional column vector is generated in a softmax form, and the value of each column vector element represents the probability of that type. As there are three event types to be determined in the embodiment of the present disclosure, then K may be 3, i.e., a 3-dimensional column vector, respectively representing the probability of a crash event, a near crash event or a base line event. The event having the maximum probability is a final prediction result.

In the embodiment of the present disclosure, the output of each layer is subjected to rectified linear unit (ReLU) non-linearity, e.g., non-linearity via an activation function. The activation function may be a Sigmoid function, a Relu function, a Tan h function, etc.

When the convolutional neural network is trained, the forward propagation phase is as follows:

The time series data, with event type tags, of the training sample is input to the convolution layer 102 via the input layer 101. The time series data progressively transformed by the convolution layer 102, the pooling layer 103 and the fully connected layer 104 is transmitted to the output layer 105.

The backward propagation phase is as follows: the weights and biases of the convolution layer 102, the pooling layer 103 and the fully connected layer 104 are adjusted according to the output result of the output layer 105 and the event type tag corresponding to each piece of time series data, so that the error between the output result of the output layer 105 and the event type tag corresponding to each piece of time series data is minimum.

When the training termination condition is met, the weights and biases of the convolution layer 102, the pooling layer 103 and the fully connected layer 104, as well as the number and size of each layer, etc., are respectively acquired.

In an embodiment of the present disclosure, when the weights and the biases are optimized in each iteration process of the training process, a stochastic gradient descent method is adopted, and the learning rate can be set to be 0.0001. In one embodiment, the learning rate is halved after every iteration to improve the training efficiency. All the time series data in the training sample is submitted sequentially in one iteration.

In an embodiment of the present disclosure, the training termination condition may be as follows: the number of iterations reaches a maximum one, or the error absolute values of judgment probabilities of the event types corresponding to all the time series data in the training sample are smaller than a preset threshold.

In an embodiment of the present disclosure, in order to improve the ability of generalization of the neural network, a preset number of neurons among the neurons of the fully connected layer are discarded at each iteration. For example, the preset number may be 50% of the total number of neurons at the previous iteration.

When the training is terminated, parameter information of the convolutional neural network is acquired: corresponding weights and biases of a convolution layer, corresponding weights and biases of a pooling layer, corresponding weights and biases of a fully connected layer, number of convolution layers, size of the convolution kernel of each convolution layer, number of pooling layers, size of each pooling layer, number of fully connected layers, size of each fully connected layer and an activation function adopted in each layer.

Figure 11:
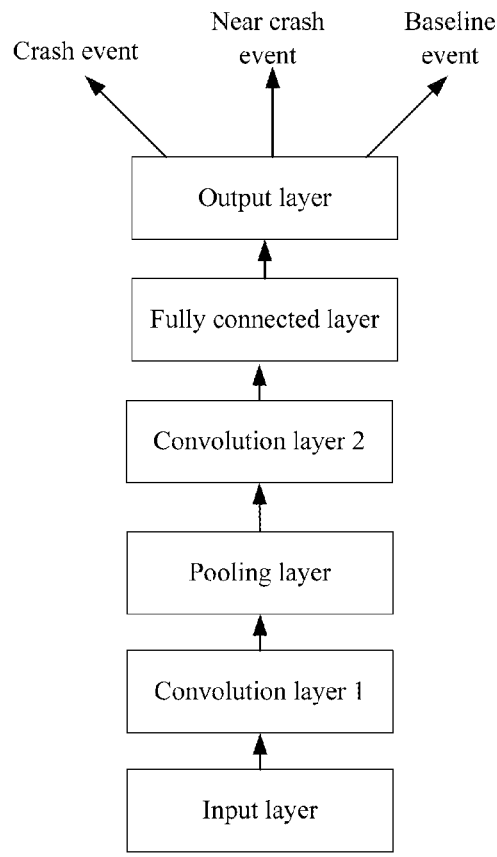
FIG. 11 is schematic diagram of a convolutional neural network adopted in an embodiment of the present disclosure.

Referring to FIG. 11, in an embodiment, the trained convolutional neural network for predicting vehicle crashes includes two convolution layers, one pooling layer, one fully connected layer and one output layer. The size of the convolution kernel of the first convolution layer is 1×6, the stride is 1, and the channel multiplier of each channel is 8; the size of the convolution kernel of the second convolution layer is 1×4, the stride is 1, and the channel multiplier of each channel is 10; the size of the sliding window of the pooling layer is 1×20, and the stride is 4; and at the first iteration, the fully connected layer includes 60 neurons. The output of the output layer is a probability of each event type. The activation functions for the first convolution layer and the second convolution layer may be a ReLU function.

Test of the Convolutional Neural Network

In order to ensure the prediction accuracy of the convolutional neural network, the trained convolutional neural network is tested by using a test sample in this embodiment of the present disclosure.

Figure 12:
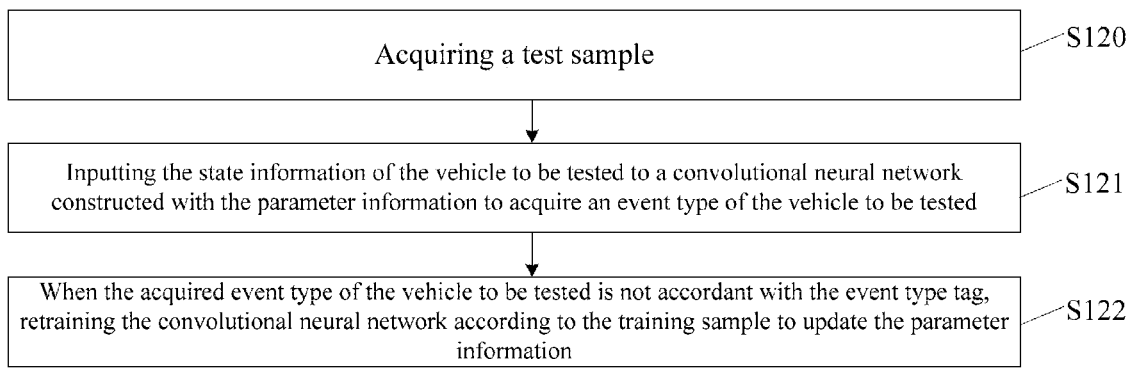
FIG. 12 is a schematic flow diagram of testing the trained convolutional neural network in an embodiment of the present disclosure.

Referring to FIG. 12, in step S120, a test sample is acquired. The test sample includes state information of a vehicle to be tested and an event type tag corresponding to the state information. In an embodiment, the test sample is selected from the training sample, e.g., 30% of sample in said training sample can be used as a test sample to test the prediction accuracy of the trained convolutional neural network.

In step S121, the state information of the vehicle to be tested is input to a convolutional neural network constructed with the parameter information to acquire an event type of the vehicle to be tested.

In step S122, when the acquired event type of the vehicle to be tested is not accordant with the event type tag, the convolutional neural network is retrained according to the training sample to update the parameter information.

When the trained convolutional neural network is tested using the test sample, it can be set that the trained convolutional neural network is used for detecting vehicle crashes when the prediction accuracy reaches a certain value, e.g., 95%. As shown in FIG. 2 described above, the acquired state information of the target vehicle is input to the trained convolutional neural network to detect whether the vehicle undergoes a crash event or a near crash event.

It should be understood that the acquired state information of the target vehicle is data from different sensors recorded according to time, and the state information recorded according to time can form time series data. In an embodiment, the time series data is preprocessed and then input to the trained convolutional neural network. The preprocessing can be performed in the manner shown in FIG. 8 described above, i.e., the time series data having non-unified timestamps is processed and merged.

The time series data of the target vehicle input to the trained convolutional neural network and the time series data in the training sample are same in height, width and number of channels.

When the target vehicle undergoes a near crash event, alerting information can be output to alert a driver to timely perform an evading operation (e.g., braking, abrupt turning, or the like) or directly perform an evading operation on the vehicle.

When the target vehicle undergoes a crash event, alarm information can be output, e.g., an alarm is emitted for rescue. In an embodiment, the information and position of the target vehicle and the like are sent to a corresponding contact according to the contact information set by the owner of the target vehicle. The contacts may be a first-aid person, a family member, an insurance company, etc.

In the embodiment of the present disclosure, crash or near crash of the vehicle is detected and recognized via the convolutional neural network, and parameters of the convolutional neural network are determined by learning, so that the accuracy of crash recognition is high. Besides, a near crash event can also be detected to assist the driver in a timely manner performing an evading operation, e.g., braking, abrupt turning, etc.

Figure 13:
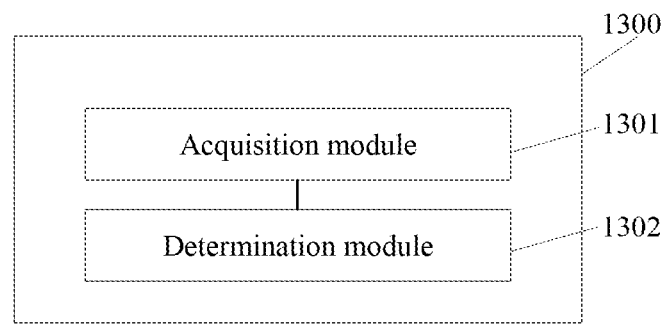
FIG. 13 is a block diagram of an apparatus for detecting vehicle crashes of an embodiment of the present disclosure.

Correspondingly, referring to FIG. 13, an embodiment of the present disclosure further provides a apparatus for detecting vehicle crashes, the apparatus 1300 including:

an acquisition module 1301, used for acquiring state information of a target vehicle; and a determination module 1302, used for determining an event type of the target vehicle according to the state information and a trained convolutional neural network, the event type being any of the following types: a crash event, a near crash event and a baseline event.

In an embodiment, the apparatus 1300 further includes:

a sample acquisition module, used for acquiring a training sample, the training sample including: multiple pieces of time series data and event type tags corresponding to each piece of time series data, wherein each piece of time series data includes state information of the vehicle recorded by at least one sensor according to time;

a training module, used for training a convolutional neural network to be trained according to the training sample and a training termination condition;

a parameter information acquisition module, used for, when the training is terminated, acquiring parameter information of the convolutional neural network to be trained, the parameter information at least including: weights of a convolution layer, biases of the convolution layer, weights of a pooling layer, biases of the pooling layer, weights of a fully connected layer, biases of the fully connected layer, number of convolution layers, size of the convolution kernel of each convolution layer, number of pooling layers, size of each pooling layer, number of fully connected layers and size of each fully connected layer; and a convolutional neural network construction module, used for constructing the convolutional neural network according to the parameter information.

In an embodiment, the sample acquisition module 1303 includes:

a time series data acquisition sub-module, used for acquiring time series data with an event type tag from at least one sensor;

a merging sub-module, used for merging the time series data with event type tags from different sensors based on timestamps; and a training sample determination sub-module, used for determining the merged time series data with event type tags as the training sample.

In an embodiment, the merging sub-module is used for, among the time series data with event type tags from different sensors, segmenting the time series data of the same event type into multiple pieces of time series data based on a minimum time window corresponding to the event and a preset time window moving amount; and merging the segmented time series data from different sensors based on timestamps.

In an embodiment, the merging sub-module is used for, when the timestamps of the time series data from different sensors are different, performing linear interpolation compensation on the time series data with a low sampling frequency; and merging the time series data after linear interpolation compensation to obtain time series data to be sampled; and the training sample determination sub-module is used for determining time series data sampled from the time series data to be sampled based on a preset sampling frequency and the corresponding event type tags thereof as the training sample.

In an embodiment, the apparatus 1300 further includes:

a test sample acquisition module, used for acquiring a test sample, the test sample including state information of a vehicle to be tested and an event type tag corresponding to the state information;

a test module, used for inputting the state information of the vehicle to be tested into a convolutional neural network constructed with the parameter information to acquire an event type of the vehicle to be tested; and an update module, used for, when the acquired event type of the vehicle to be tested is not accordant with the event type tag, retraining the convolutional neural network according to the training sample to update the parameter information.

Regarding the apparatus in the above embodiments, the specific mode of operation executed by each module has been described in detail in the embodiment about the method, and thus is not elaborated herein.

Correspondingly, the present disclosure further provides a computer readable storage medium, storing a computer program which, when executed by a processor, performs the steps of said method for detecting vehicle crashes.

Correspondingly, the present disclosure further provides an electronic device, including: said computer readable storage medium; and one or more processors, used for executing the program in the computer readable storage medium.

Figure 14:
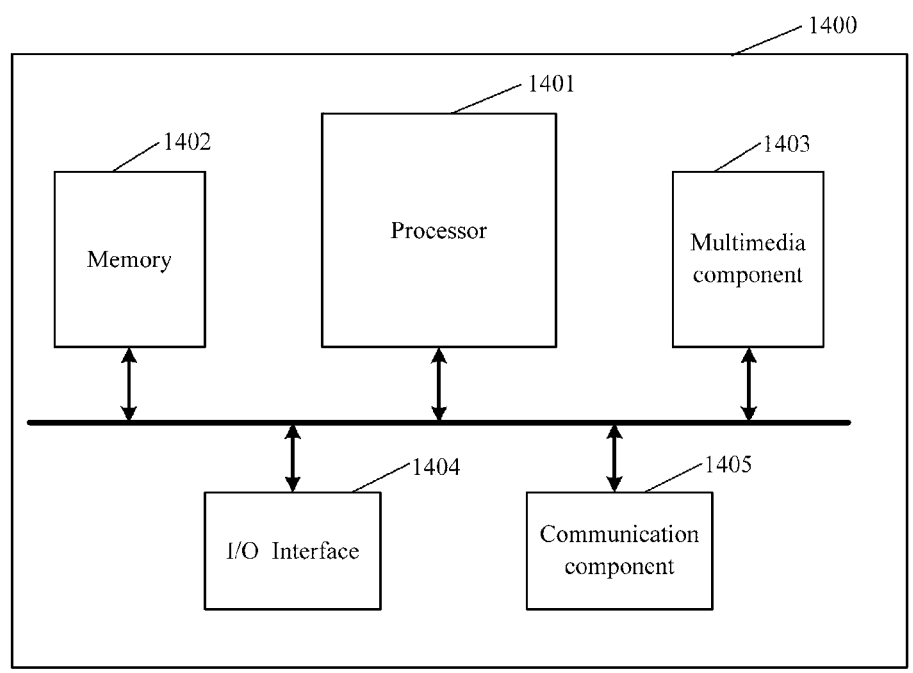
FIG. 14 is a block diagram of an electronic device shown according to an exemplary embodiment.

FIG. 14 is a block diagram of an electronic device 1400 shown according to an exemplary embodiment. As shown in FIG. 14, the electronic device 1400 may include a processor 1401, a memory 1402, a multimedia component 1403, an input/output (I/O) interface 1404, a communication component 1405 and one or more said sensors. The electronic device 1400 may be a smart phone provided with hardware such as a GPS, an accelerometer, a gyroscope and the like, and when being placed in a target vehicle, the electronic device can acquire data reflecting state information of the vehicle. On the other hand, the electronic device can also communicate with the target vehicle via the communication component 1405 to acquire the state information of the vehicle in real time. Besides, the electronic device 1400 can store a trained convolutional neural network into the memory 1402 or train a convolutional neural network according to the method above to obtain a trained convolutional neural network, thus, the trained convolutional neural network is called via the processor 1401, and the event type of the vehicle is determined according to the acquired state information of the vehicle.

The processor 1401 is used for controlling overall operation of the electronic device 1400 to accomplish all of or part of the steps of said method for detecting vehicle crashes. The memory 1402 is used for storing various types of data to support the operation in the electronic device 1400, and the data, for example, may include instructions for any application or method operated on the electronic device 1400 and data related to applications, e.g., contact data, received and transmitted messages, pictures, audio, video, etc. The memory 1402 may be implemented by any type of volatile or non-volatile storage device or a combination thereof, e.g., a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disc or an optical disc. The multimedia component 1403 may include a screen and an audio component. The screen may be a touch screen, and the audio component is used for outputting and/or inputting audio signals. For example, the audio component may include a microphone, which is used for receiving external audio signals. The received audio signals may be further stored in the memory 1402 or transmitted via the communication component 1405. The audio component further includes at least one loudspeaker for outputting audio signals. The I/O interface 1404 provides an interface between the processor 1401 and other interface module, and the other interface module may be a keyboard, a mouse, buttons or the like. These buttons may be virtual buttons or physical buttons. The communication component 1405 is used for wired or wireless communication between the electronic device 1400 and other devices. Wireless communication refers to, for example, Wi-Fi, Bluetooth, near field communication (NFC), 2G, 3G, 4G or 5G or a combination thereof, and thus the corresponding communication component 1405 may include a Wi-Fi module, a Bluetooth module, an NFC module, a 2G module, a 3G module, a 4G module or a 5G module.

In an exemplary embodiment, the electronic device 1400 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components, and is used for executing said method for detecting vehicle crashes.

Correspondingly, an embodiment of the present disclosure further provides a vehicle, including: said computer readable storage medium; and one or more processors, used for executing the program in the computer readable storage medium.

Preferred embodiments of the present disclosure are described in detail above in combination with the accompanying drawings, but the present disclosure is not limited to the specific details in the above embodiments. Many simple modifications may be made to the technical solutions of the present disclosure within the technical conception of the present disclosure, and all these simple modifications fall into the protection scope of the present disclosure.

In addition, it should be noted that the specific technical features described in said specific embodiments may be combined in any appropriate mode without conflicts. In order to avoid unnecessary repetition, various possible combinations would not be additionally described in the present disclosure.

Moreover, various different embodiments of the present disclosure may also be combined randomly, and the combinations should be regarded as contents disclosed by the present disclosure as long as they do not go against the thought of the present disclosure.

The invention claimed is:

1. A method for detecting vehicle crashes, comprising:
    acquiring a training sample, wherein the training sample comprises: multiple pieces of time series data and event type tags corresponding to each piece of time series data, wherein each piece of time series data comprises state information of the vehicle recorded by at least one sensor according to time;
    training a convolutional neural network according to the training sample and a training termination condition;
    when the training is terminated, acquiring parameter information of the convolutional neural network to be trained, wherein the parameter information at least comprises: weights of a convolution layer, biases of the convolution layer, weights of a pooling layer, biases of the pooling layer, weights of a fully connected layer, biases of the fully connected layer, number of convolution layers, size of the convolution kernel of each convolution layer, number of pooling layers, size of each pooling layer, number of fully connected layers and size of each fully connected layer;
    constructing the convolutional neural network according to the parameter information;
    acquiring state information of a target vehicle; and
    determining an event type of the target vehicle according to the state information and a trained convolutional neural network, the event type being any of the following types: a crash event, a near crash event and a baseline event;
    wherein the step of acquiring a training sample comprises:
    acquiring time series data with an event type tag from at least one sensor;
    merging the time series data with event type tags from different sensors based on timestamps; and
    determining the merged time series data with event type tags as the training sample;
    wherein the step of merging the time series data with event type tags from different sensors based on timestamps comprises:
    when the timestamps of the time series data from different sensors are different, performing linear interpolation on the time series data with a low sampling frequency; and
    merging the time series data after linear interpolation to obtain time series data to be sampled;
    the step of determining the merged time series data with event type tags as the training sample comprises:
    determining time series data sampled from the time series data to be sampled at a preset sampling frequency and the corresponding event type tags thereof as the training sample.

2. The method of claim 1, wherein the step of merging the time series data with event type tags from different sensors based on timestamps comprises:
    among the time series data with event type tags from different sensors, segmenting the time series data of the same event type into multiple pieces of time series data based on a minimum time window corresponding to the event and a preset time window moving amount; and
    merging the segmented time series data from different sensors based on timestamps.

3. The method of claim 1, further comprising:
    discarding a preset number of neurons in the fully connected layer at each iteration.

4. The method of claim 1, further comprising:
    acquiring a test sample, wherein the test sample comprises state information of a vehicle to be tested and an event type tag corresponding to the state information;
    inputting the state information of the vehicle to be tested into a convolutional neural network constructed with the parameter information to acquire an event type of the vehicle to be tested; and
    when the acquired event type of the vehicle to be tested is not accordant with the event type tag, retraining the convolutional neural network according to the training sample to update the parameter information.

5. The method of claim 1, wherein the state information of the vehicle comprises: speed, acceleration in the X direction, acceleration in the Y direction, acceleration in the Z direction, angular speed in the X direction, angular speed in the Y direction and angular speed in the Z direction.

6. The method of claim 1, wherein the step of determining an event type of the target vehicle according to the state information and a trained convolutional neural network, comprises:
    preprocessing the state information; and
    determining an event type of the target vehicle according to the preprocessed state information and a trained convolutional neural network.

7. The method of claim 6, wherein the state information is the time series data from different sensors recorded according to time;
    the step of preprocessing the state information comprises:
    merging the time series data from different sensors recorded according to time, based on timestamps.

8. The method of claim 1, further comprising:
    when the event type of the target vehicle is the near crash event, outputting alerting information; and
    when the event type of the target vehicle is the crash event, outputting alarm information.

9. A non-transitory computer readable storage medium, storing a computer program which, when the computer program in the storage medium is executed by a processor, the processor is caused to:
- acquire a training sample, wherein the training sample comprises: multiple pieces of time series data and event type tags corresponding to each piece of time series data, wherein each piece of time series data comprises state information of the vehicle recorded by at least one sensor according to time;
- train a convolutional neural network according to the training sample and a training termination condition;
- when the train is terminated, acquire parameter information of the convolutional neural network to be trained, wherein the parameter information at least comprises: weights of a convolution layer, biases of the convolution layer, weights of a pooling layer, biases of the pooling layer, weights of a fully connected layer, biases of the fully connected layer, number of convolution layers, size of the convolution kernel of each convolution layer, number of pooling layers, size of each pooling layer, number of fully connected layers and size of each fully connected layer;
- construct the convolutional neural network according to the parameter information;
- acquire state information of a target vehicle; and
- determine an event type of the target vehicle according to the state information and a trained convolutional neural network, the event type being any of the following types: a crash event, a near crash event and a baseline event;
- wherein the step of acquire a training sample comprises:
- acquire time series data with an event type tag from at least one sensor;
- merge the time series data with event type tags from different sensors based on timestamps; and
- determine the merged time series data with event type tags as the training sample;
- wherein the step of merging the time series data with event type tags from different sensors based on timestamps comprises:
- when the timestamps of the time series data from different sensors are different, perform linear interpolation on the time series data with a low sampling frequency; and
- merge the time series data after linear interpolation to obtain time series data to be sampled;
- the step of determining the merged time series data with event type tags as the training sample comprises:
- determine time series data sampled from the time series data to be sampled at a preset sampling frequency and the corresponding event type tags thereof as the training sample.

10. An electronic device, comprising:
- a computer readable storage medium, storing a computer program thereupon; and
- one or more processors, used for executing the program in the computer readable storage medium so as to:
- acquire a training sample, wherein the training sample comprises: multiple pieces of time series data and event type tags corresponding to each piece of time series data, wherein each piece of time series data comprises state information of the vehicle recorded by at least one sensor according to time;
- train a convolutional neural network according to the training sample and a training termination condition;
- when the train is terminated, acquire parameter information of the convolutional neural network to be trained, wherein the parameter information at least comprises: weights of a convolution layer, biases of the convolution layer, weights of a pooling layer, biases of the pooling layer, weights of a fully connected layer, biases of the fully connected layer, number of convolution layers, size of the convolution kernel of each convolution layer, number of pooling layers, size of each pooling layer, number of fully connected layers and size of each fully connected layer;
- construct the convolutional neural network according to the parameter information;
- acquire state information of a target vehicle; and
- determine an event type of the target vehicle according to the state information and a trained convolutional neural network, the event type being any of the following types: a crash event, a near crash event and a baseline event;
- wherein the step of acquire a training sample comprises:
- acquire time series data with an event type tag from at least one sensor;
- merge the time series data with event type tags from different sensors based on timestamps; and
- determine the merged time series data with event type tags as the training sample;
- wherein the step of merging the time series data with event type tags from different sensors based on timestamps comprises:
- when the timestamps of the time series data from different sensors are different, perform linear interpolation on the time series data with a low sampling frequency; and
- merge the time series data after linear interpolation to obtain time series data to be sampled;
- the step of determining the merged time series data with event type tags as the training sample comprises:
- determine time series data sampled from the time series data to be sampled at a preset sampling frequency and the corresponding event type tags thereof as the training sample.

* * * * *